(12) United States Patent
Cho et al.

(10) Patent No.: US 8,378,024 B2
(45) Date of Patent: Feb. 19, 2013

(54) LOW SURFACE GLOSS STYRENE RESIN COMPOSITION, AND LOW SURFACE GLOSS SHEET AND COMPOSITE ARTICLE THEREFROM

(75) Inventors: Yun-kyoung Cho, Daejeon (KR); Seon-mo Son, Daejeon (KR); Bong-keun Lee, Daejeon (KR); Tae-bin Ahn, Daejeon (KR); Han-jong You, Daejeon (KR); Sung-tae Ahn, Daejeon (KR)

(73) Assignee: LG Chem, Ltd. (KR)

( * ) Notice: Subject to any disclaimer, the term of this patent is extended or adjusted under 35 U.S.C. 154(b) by 446 days.

(21) Appl. No.: 12/525,575

(22) PCT Filed: Jan. 30, 2008

(86) PCT No.: PCT/KR2008/000559
§ 371 (c)(1),
(2), (4) Date: Nov. 13, 2009

(87) PCT Pub. No.: WO2008/096976
PCT Pub. Date: Aug. 14, 2008

(65) Prior Publication Data
US 2010/0075165 A1    Mar. 25, 2010

(30) Foreign Application Priority Data

Feb. 7, 2007   (KR) .................. 10-2007-0012861
Sep. 18, 2007   (KR) .................. 10-2007-0094860

(51) Int. Cl.
*C08L 25/04*   (2006.01)
*C08L 25/06*   (2006.01)
*C08L 25/10*   (2006.01)
*C08L 25/12*   (2006.01)

(52) U.S. Cl. ............... 525/71; 525/93; 525/94; 525/98

(58) Field of Classification Search ............. 525/71, 525/93, 94, 98
See application file for complete search history.

(56) References Cited

U.S. PATENT DOCUMENTS

| | | | |
|---|---|---|---|
| 4,169,869 A | 10/1979 | Milenius | |
| 4,652,614 A | 3/1987 | Eichenauer et al. | |
| 4,668,767 A | 5/1987 | Swearingen et al. | |
| 5,081,193 A | 1/1992 | Mishima et al. | |
| 5,237,004 A | 8/1993 | Wu et al. | |
| 5,460,818 A * | 10/1995 | Park et al. ................ | 426/415 |
| 5,475,053 A | 12/1995 | Niessner et al. | |
| 5,990,217 A * | 11/1999 | Nakano et al. ............ | 524/423 |
| 6,169,146 B1 * | 1/2001 | Okada et al. ............. | 525/241 |

FOREIGN PATENT DOCUMENTS

| | | |
|---|---|---|
| CN | 1033915 A | 7/1989 |
| CN | 1059347 A | 3/1992 |
| EP | 0933393 A1 | 8/1999 |
| JP | 2001-288328 A | 10/2001 |

OTHER PUBLICATIONS

Picchioni et al., Blends of Syndiotactic Polystyrene with SBS Triblock Copolymers, 2001, Macromol. Chem. Phys. vol. 202, pp. 2142-2147.*

Aoyama, partial electronic translation of JP 2001-128328 (Oct. 2001).*

International Search Report, PCT/KR2008/000559, dated May 16, 2008.

Supplementary European Search Report, EP 08712236, dated Oct. 21, 2010.

* cited by examiner

*Primary Examiner* — Jeffrey Mullis
(74) *Attorney, Agent, or Firm* — Lerner, David, Littenberg, Krumholz & Mentlik, LLP

(57) ABSTRACT

The present invention relates to a low surface gloss styrene resin composition. The composition of the present invention is composed of (A) 80-99.9 weight % of the basic resin comprising rubber-modified styrene resin and (B) 0.1-20 weight % of syndiotactic polystyrene, the matting agent. The composition also includes (C) hydrogenated styrene block copolymer comprising styrene block and butadiene rubber block as a compatibilizer by 0.1-20 weight % for the total weight of the low surface gloss styrene resin composed of (A) the basic resin and (B) the matting agent and additionally includes (D) a plasticizer by 0.1-30 weight %. The composition of the present invention has excellent weatherability and impact-resistance in addition to the low surface gloss properties, so that it can be applied in various products, particularly exterior products for structures such as sidings and window frames, etc.

28 Claims, 2 Drawing Sheets

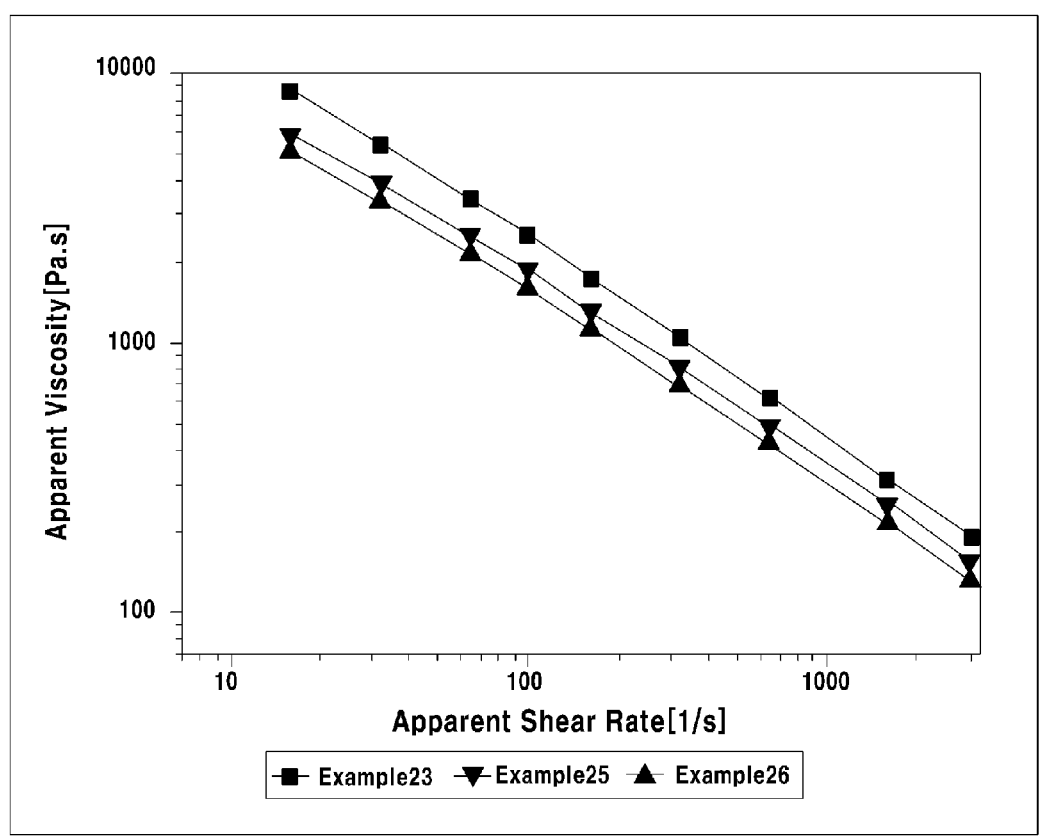

LOW SURFACE GLOSS STYRENE RESIN COMPOSITION, AND LOW SURFACE GLOSS SHEET AND COMPOSITE ARTICLE THEREFROM

CROSS REFERENCE TO RELATED APPLICATIONS

The present application is a national phase entry under 35 U.S.C. §371 of International Application No. PCT/KR2008/000559, filed Jan. 30, 2008, which claims the benefit of Korean Patent Application No. 10-2007-0012861, filed Feb. 7, 2007 and Korean Patent Application No. 10-2007-0094860, filed Sep. 18, 2007. The disclosures of said applications are incorporated by reference herein.

TECHNICAL FIELD

The present invention relates to a low surface gloss styrene resin composition, a sheet and a composite article prepared using the same, more precisely a low surface glow styrene resin composition particularly appropriate for the application in the exterior of structures, for example sidings, window frames, etc, owing to its excellent weatherability and impact strength and reduced surface gloss, and a sheet and a composite article prepared using the same.

BACKGROUND ART

A styrene copolymer comprising resin matrix and elastomer or rubber is exemplified by acrylate-styrene-acrylonitrile (ASA), olefin-styrene-acrylonitrile (OSA), acrylonitrile-ethylene propylene diene rubber (EPDM)-styrene (AES) and acrylonitrile-butadiene-styrene (ABS). These resins have different characteristics according to their elastomer components. In particular, ASA resin has excellent impact strength, processibility and weatherability, while ABS resin has excellent low-temperature impact resistance and processibility.

Thermoplastic resins such as ABS and ASA resins are in increasing demand in a variety of fields including household supplies, automobile interior materials, office equipments, and construction materials. Most products produced by using such thermoplastic resin compositions has high gloss and the extruded products prepared from ABS, AES and ASA resins have high surface gloss (75° gloss: 90) or medium surface gloss (75° gloss: 60).

With recent demand for emotional quality of a product according to the rising sensitivity to beauty of a customer, a low surface gloss resin is also in increasing demand. Besides, with the rising concern about environment conservation, it has been a new trend to use a low gloss resin directly for the production with eliminating the processes of low gloss painting and covering pad. Particularly, the use of a low surface gloss resin composition for the production of structure sidings, computer housings and keyboards, electric appliances and auto-parts has been significantly increasing. Therefore, ABS, AES, and ASA resins, preferably ASA resin most of all, with reduced surface gloss but having as excellent properties as the conventional ASA resin must be preferred in the field of construction, especially for the production of exterior articles for structures including sidings.

To produce a low surface gloss resin, it is the most common method to regulate smoothness of the resin surface to be larger than visible spectral region so as to scatter away the incident rays, resulting in glossless effect.

Embossing and low gloss coating on the surface of a molded product have been conventionally tried. However, these methods require an additional process with increasing the production cost, and produce a molded product with less glossless effect on its surface and with poor processibility.

Another conventional method is to add a specific rubber or elastomer component to improve the quality. Precisely, this method is exemplified by the following three methods. First is the method to improve ABS resin by using large caliber rubber particles of at least 2□ in mean diameter produced by bulk polymerization. However, the resin prepared by this method has insufficient low gloss effect in addition to poor impact strength and heat resistance. Second is the method to add a glossless filler of at least 5□ in mean diameter to a resin. However, the resin prepared by this method also has problems of insufficient low gloss effect and very poor impact strength, even if it has excellent formability. Third is the method to produce ABS resin by grafting ABS polymer prepared by emulsion polymerization with such a modifier as ethylene-unsaturated carboxylic acid, which has been widely used these days, because the resin prepared by this method has excellent impact strength and general physical properties and low gloss effect. However, this resin also has limitation because when it is applied to weatherable resin (ASA), heat-resistance and weatherability are reduced.

U.S. Pat. No. 5,081,193 describes a matting agent for thermoplastic resin which comprises the graft copolymer containing low-cis polybutadiene as a rubber component. U.S. Pat. No. 5,237,004 describes a method for reducing surface gloss by adding 2-15□ sized polymer particles to the thermoplastic polymer composition having core/shell structure. U.S. Pat. No. 5,475,053 describes a molding composition having glossless surface which comprises an impact strength improved thermoplastic resin such as ABS or ASA and a matting agent. U.S. Pat. No. 4,652,614 describes a molding material having glossless surface prepared by using neutral and acidic graft polymers as a substrate. U.S. Pat. No. 4,169,869 describes ABS compound having low surface gloss or glossless finish. U.S. Pat. No. 4,668,767 describes a graft polymer having glossless surface which comprises 20-0.1 weight part of heterocyclic nitrogen substrate in micro-particular rubber containing rubber by 5-80 weight % in total and having mean diameter of 0.05-20.0□ and glass transition temperature of up to 10° C.; 40-99.8 weight part of aromatic vinyl monomer; 20-0.1 weight part of mono- or di-acid containing a polymerizable double bond; and 0-40 weight part of acrylonitrile.

However, all the conventional methods are limited in satisfying the required qualities and properties such as weatherability, impact resistance, reduced surface gloss, surface quality, production costs and processibility and have at least one of disadvantages.

DISCLOSURE OF INVENTION

Technical Problem

It is an object of the present invention, to overcome the above problems of the prior art, to provide a low surface gloss styrene resin composition having excellent weatherability and impact resistance and reduced surface gloss appropriate for the exterior materials of structures for example for sidings and window frames.

It is another object of the present invention to provide a low surface gloss styrene resin composition having improved processibility and impact resistance.

It is further an object of the present invention to provide a sheet and a composite suitable for the exterior sidings of structures which are produced by using the low surface gloss styrene resin composition with improved processability, and a method for producing the same.

Technical Solution

The above objects and other objects of the present invention can be achieved by the following embodiments of the present invention.

The present invention is described in detail hereinafter.

To achieve the objects of the invention, the present invention provides a low surface gloss styrene resin composition. The composition of the present invention contains a low surface gloss styrene resin comprising (A) 80-99.9 weight % of a basic resin containing rubber-modified styrene polymer; and (B) 0.1-20 weight % of syndiotactic polystyrene as a matting agent. The composition of the invention additionally includes (C) styrene block and butadiene rubber block as a compatibilizer and hydrogenated styrene block copolymer by 0.1-20 weight % for the total weight of the low surface gloss styrene resin composed of (A) the basic resin and (B) the matting agent. The rubber-modified styrene polymer is prepared by copolymerization of styrene monomer and selected unsaturated ethylene compound in the presence of rubber.

Herein, it is preferred for the basic resin (A) to include additionally non-rubber modified styrene copolymer prepared by copolymerization of a styrene monomer and an unsaturated ethylene compound. In particular, the non-rubber modified styrene copolymer is preferably the mixture of styrene-acrylonitrile copolymer and styrene-acrylonitrile-(meth)acrylate copolymer.

It is also preferred for the low surface gloss styrene resin composition of the present invention to include additionally (D) a plasticizer by 0.1-30 weight % for the total weight of the low surface gloss styrene resin composed of (A) the basic resin and (B) the matting agent.

The low surface gloss styrene resin composition of the present invention has 1-50 of the 75° gloss.

The present invention also provides a method for producing a sheet, in which the low surface gloss styrene resin composition is extruded by an extruder at the temperature range from at least 180° C. to the temperature at least 20° C. lower than the melting point of the matting agent, syndiotactic polystyrene, and a sheet prepared by the same.

The present invention further provides a composite article containing an outside layer that covers at least one of surfaces of the inside layer to prevent the inside layer from being exposed on external environment. At this time, the inside layer is prepared by the thermoplastic resin that has not so good weatherability as the outside layer, while the outside layer is prepared by the low surface gloss styrene resin composition.

The present inventors confirmed that when a composition was produced with weatherable styrene resin and syndiotactic polystyrene (sPS) as a matting agent, the matting agent therein could lower the gloss of the styrene resin significantly without devastating weatherability and impact resistance of the styrene resin, based on which the inventors established this invention. So, the present inventors completed this invention by confirming that the thermoplastic resin composition comprising weatherable styrene resin, syndiotactic polystyrene (sPS) as a matting agent, and additionally additives such as a compatibilizer and a plasticizer to improve processability, wherein the contents of the rubber and the matting agent in the styrene resin were regulated, had excellent falling weight or dart impact strength, weatherability and low surface gloss effect.

The low surface gloss styrene resin composition of the present invention contains (A) 80-99.9 weight % of a basic resin containing rubber-modified styrene polymer, and (B) 0.1-20 weight % of syndiotactic polystyrene, the matting agent.

The low surface gloss styrene resin composition of the present invention contains (A) 80-99.9 weight % of a basic resin containing rubber-modified styrene polymer, and (B) 0.1-20 weight % of syndiotactic polystyrene, the matting agent, and additionally includes (C) styrene block and butadiene rubber block as a compatibilizer and hydrogenated styrene block copolymer by 0.1-20 weight % for the total weight of the low surface gloss styrene resin comprising (A) the basic resin and (B) the matting agent. The low surface gloss styrene resin composition of the present invention additionally includes (D) a plasticizer by 0.1-30 weight % for the total weight of the low surface gloss styrene resin composed of (A) the basic resin and (B) the matting agent.

The low surface gloss styrene resin composition of the present invention has 1-50 of the 75° gloss when measured with a TOYOSEIKI gloss meter (UD).

Hereinafter, the constituents of the composition of the present invention are described in detail.

In this description, (a) rubber-modified styrene polymer and (b) non-rubber modified styrene copolymer are generally called (A) styrene resin for convenience, which would be the basic resin of the present invention. And together, (A) styrene resin and (B) syndiotactic polystyrene, the matting agent, are called low surface gloss styrene resin.

Therefore, the low surface gloss styrene resin composition of the present invention necessarily includes the low surface styrene resin and additionally includes (C) a compatibilizer and/or (D) a plasticizer.

(A) Styrene Resin

The styrene resin used for the composition of the present invention indicates the copolymer resin produced by copolymerization of styrene monomer and other comonomers, which includes rubber-modified styrene monomer and non-rubber modified styrene copolymer produced by copolymerization of styrene monomer and unsaturated ethylene compound. Herein, the unsaturated ethylene compound indicates the compound having carbon-carbon double bond and carbon-non carbon unsaturated bond.

The styrene monomer herein includes not only styrene but also styrene derivatives containing substituents.

(a) Rubber-Modified Styrene Polymer

The rubber-modified styrene polymer of the present invention is preferably produced by copolymerization of styrene monomer and selected unsaturated ethylene compound in the presence of elastomer rubber.

The elastomer rubber can be prepared by polymerization of alkyl acrylate containing $C_1$-$C_{32}$ alkyl, more preferably $C_1$-$C_8$ alkyl, butadiene, isoprene, olefin, and a mixture thereof. At this time, the comonomer for preparing the rubber can be one or more compounds selected from the group consisting of unsaturated ethylene compound, styrene monomer and multifunctional monomer. The content of the copolymer for preparing the rubber is as much as the rubber properties can be expressed. The acceptable content of such comonomer is known to those in the art and can be adjusted by experiment.

The elastomer rubber can be selected from the group consisting of polybutadiene, polyisoprene, styrene-butadiene copolymer, acrylonitrile-butadiene copolymer, alkyl acrylate rubber, ethylene-propylene rubber (EPM), ethylene-propylene-diene rubber (EPDM) and silicon rubber.

The preferable content of the elastomer rubber in the rubber-modified styrene resin is 5-50 weight %. The proper content of the rubber is very important for producing the composition of the present invention having satisfactory impact resistance. If the rubber content is too high, hardness and scratch-resistance will be reduced. The styrene monomer can be selected from the group consisting of styrene, α-methyl styrene, o-methyl styrene, p-methyl styrene, m-methyl styrene, 1,3-dimethyl styrene and tert-butyl styrene. Among these, styrene, α-methyl styrene, p-methyl styrene or tert-butyl styrene is preferred. And styrene or α-methyl styrene is more preferred.

The rubber-modified styrene polymer can be produced by copolymerization of only rubber and styrene monomer, but it is preferred for the rubber-modified styrene polymer to be prepared by copolymerization of rubber, styrene monomer, and unsaturated ethylene compound.

The unsaturated ethylene compound can be selected from the group consisting of acrylonitrile, methacrylonitrile, $C_1$-$C_4$ alkyl acrylate and alkyl methacrylate, acrylic acid, methacrylic acid, maleic anhydride and acrylamide, and among these, acrylonitrile is preferred.

The preferable content of the unsaturated ethylene compound in the rubber-modified styrene polymer is 5-50 weight %. The above content favors the improvement of heat-resistance, chemical-resistance and mechanical strength. At this time, the content of the styrene monomer in the rubber-modified styrene polymer is 40-90 weight %, more preferably 50-70 weight %. The mentioned content range favors the improvement of mechanical strength and impact strength.

The method for producing the rubber-modified styrene polymer is well known to those in the art, which is exemplified by bulk polymerization, solution polymerization, emulsion polymerization, and suspension polymerization. Particularly emulsion polymerization is widely used. The rubber-modified styrene resin used in this invention can be prepared by any conventional method.

(b) Non-Rubber Modified Styrene Copolymer

To regulate rubber content or to regulate physical properties such as impact-resistance and weatherability of the styrene resin of the present invention, the resin can additionally include non-rubber modified styrene copolymer prepared by copolymerization of styrene monomer and unsaturated ethylene compound, in addition to the rubber-modified polymer.

The unsaturated ethylene compound can be the same as mentioned above and preferably included in the styrene copolymer by 20-80 weight %.

The styrene copolymer herein can be one or more compounds selected from the group consisting of styrene-acrylonitrile copolymer, styrene/acrylonitrile/methylmethacrylate terpolymer, α-methylstyrene/acrylonitrile copolymer, styrene/methylmethacrylate copolymer, styrene/maleic anhydride copolymer, α-methylstyrene/styrene/acrylonitrile terpolymer, styrene/acrylonitrile/maleic anhydride, styrene/acrylonitrile/acrylic acid terpolymer, and α-methylstyrene/styrene/acrylonitrile terpolymer.

In particular, styrene/acrylonitrile copolymer, styrene/acrylonitrile/(meth)acrylate terpolymer or their mixture is preferred.

(b1) Styrene/Acrylonitrile Copolymer (SAN)

The SAN copolymer can be prepared by bulk polymerization or emulsion polymerization. The styrene monomer included in the SAN copolymer can be selected among the compounds mentioned above and additionally the one having various substituents can be included.

The acrylonitrile monomer included in the SAN copolymer can be one or more compounds selected from the group consisting of acrylonitrile, metha acrylonitrile and etha acrylonitrile, and additionally other acrylonitrile monomer containing various substituents can be included without limitation. In this description, acrylonitrile derivatives can also be understood as acrylonitrile based monomer or acrylonitrile monomer.

The content of the acrylonitrile monomer in the styrene/acrylonitrile copolymer is preferably 10-50 weight %. If the content is less than 10 weight %, chemical-resistance of the product will be reduced. On the contrary, if the content is more than 50 weight %, viscosity will be increased, resulting in the decrease of processibility.

Weight average molecular weight of the non-rubber modified styrene copolymer containing the styrene monomer and acrylonitrile monomer is preferably 50,000-250,000. If the weight average molecular weight is out of the above range, physical properties and outward expression will be poor.

(b2) Styrene/Acrylonitrile/(Meth)Acrylate Copolymer (SAN-MMA)

The styrene/acrylonitrile/(meth)acrylate copolymer used in this invention is preferably the copolymer prepared by copolymerization of 40-80 weight % of methacrylic acid alkylester derivatives or acrylic acid alkylester derivatives, 15-40 weight % of styrene monomer and 3-20 weight % of acrylonitrile monomer. The method for preparing the copolymer is not limited to specific one, but suspension polymerization or bulk polymerization is preferred. Particularly continuous bulk polymerization is more preferred considering the production costs.

When the copolymer is prepared by bulk polymerization, the content of acrylonitrile can be increased. When the copolymer is polymerized in water phase, for example by emulsion polymerization or suspension polymerization, vinylcyan derivative such as hydrophilic acrylonitrile produces homo polymer in proportion to the acrylonitrile content, resulting in color change of the resin to yellow. However, when the copolymer is prepared by bulk polymerization, homo polymer is less produced even with the increase of the vinylcyan derivative content, reducing the risk of color change to yellow. Thus, bulk polymerization is preferred because the vinylcyan derivative content can be increased so as to improve chemical-resistance and impact-resistance. The preferable content of the vinylcyan derivative is 3-20 weight %. If the content of the vinylcyan derivative is less than 3 weight %, chemical-resistance, scratch-resistance and impact strength will be reduced. If the content is more than 20 weight %, color of the resin will turn to yellow.

In the meantime, if the contents of the methacrylic acid or acrylic acid alkyl ester and styrene monomer are out of the above range, transparency will be decreased.

The styrene monomer and acrylonitrile monomer used for polymerization of styrene/acrylonitrile/(meth)acrylate copolymer are as mentioned hereinbefore. The methacrylic acid or acrylic acid alkyl ester derivative is exemplified by methacrylic acid methyl ester, methacrylic acid ethyl ester and methacrylic acid lauryl ester, and among these, methacrylic acid methyl ester, that is methyl methacrylate, is more preferred.

The non-rubber modified styrene copolymer (b) can be mixed with the styrene resin by the conventional extrusion mixing using single or twin-screw extruder. Precisely, melts of the rubber-modified styrene polymer (a) and the non-rubber modified styrene copolymer (b) are mixed thoroughly at over 200° C.

The styrene resin can additionally include an additive such as a filler, a compatible plastic, an anti-electrostatic agent, an antioxidant, a flame retardant or a lubricant. The additive herein can be added by 0.1-70 weight part for 100 weight part of the styrene resin.

The styrene resin can additionally include a pigment or a dye by 0.02-10 weight part for 100 weight part of the styrene resin.

The rubber-modified styrene polymer can be ASA, ABS or AES resin. The non-rubber modified styrene copolymer (b) can be the resin containing (b1) styrene/acrylonitrile (SAN) copolymer and (b2) styrene/acrylonitrile/methylmethacrylate (SAN-MMA) terpolymer. It is preferred to use ASA resin or ASA resin together with SAN copolymer and SAN-MMA copolymer.

Particularly, the styrene resin (A) prepared by mixing rubber-modified styrene resin (a) prepared by grafting butylacrylate or tricyclodecenylacrylate elastomer rubber with styrene and acrylonitrile (weight ratio=75:25), styrene/acrylonitrile copolymer (b1) containing 22-25 weight % of acrylonitrile, and styrene/acrylonitrile/methylmethacrylate terpolymer (b2) containing 60-80 weight % of methacrylate is preferred.

The preferable content of the styrene resin (A) in 100 weight part of the low surface gloss styrene resin composition is 80-99.9 weight %. When the content is in the above range, mechanical strength is excellent and particularly weatherability and low gloss effect are improved.

(B) Matting Agent

The matting agent used in this invention is syndiotactic polystyrene (sPS), the crystalline polymer. The syndiotactic polystyrene herein includes not only polystyrene prepared by polymerization of styrene monomer but also polystyrene copolymer prepared by copolymerization of styrene monomer and comonomer. The styrene monomer includes styrene and also styrene derivatives. The comonomer used for the copolymerization with styrene monomer is added up to 10 weight %, more precisely 0.1-10 weight %, which is selected from the group consisting of maleic anhydride, maleic acid, fumaric acid and glycidyl methacrylate. The syndiotactic polystyrene contains carboxylic acid on at least one of its terminals. So, the syndiotactic polystyrene (sPS) can be selected from the group consisting of polystyrene, carboxyl terminal-syndiotactic polystyrene (sPS-COOH), maleic anhydride-syndiotactic polystyrene (sPS-MAH), maleic acid-syndiotactic polystyrene (sPS-MA), fumaric acid-syndiotactic polystyrene (sPS-FA) and glycidyl methacrylate-syndiotactic polystyrene (sPS-GMA).

The matting agent sPS has a space structure generally known syndiotactic structure in which there is a main branch formed by C—C bond and side branches comprising phenyl group or substituted phenyl group are sitting opposite to each other on the main branch. Unlike the conventional amorphous common atactic polystyrene, the matting agent is a polymer having crystalline structure. The space structure thereof can be represented by measuring tacticity with C13-NMR.

The sPS herein can be a copolymer or a copolymer mixture containing styrene such as polystyrene having at least 85% tacticity in the case of dyad and at least 35% in the case of pentad (racemipentad), poly halogenated styrene, poly alkoxy styrene, poly alkyl styrene, poly benzoate ester styrene or styrene derivatives as a major component.

The melting temperature of the matting agent is approximately 260-280° C. Compared with the conventional styrene polymer having atactic structure, this agent has excellent heat-resistance and mechanical properties.

The preferable content of the matting agent in 100 weight part of the low surface gloss styrene resin composition is 0.1-20 weight %, more preferably 1-10 weight %. When the content is within the above range, impact strength is excellent and glossless property is improved.

(C) Compatibilizer

In this invention, a compatibilizer is used in order to increase miscibility between syndiotactic polystyrene (sPS) and styrene resin. The compatibilizer herein can be styrene block copolymer containing styrene repetitive block and butadiene rubber block and more preferably hydrogenated styrene block copolymer. The butadiene rubber block can be prepared by polymerization of butadiene or butadiene derivatives such as isoprene, or by copolymerization of butadiene or butadiene derivatives with such comonomer as ethylene and propylene. The styrene block copolymer is best exemplified by the styrene block copolymer (SEBS) having the structure of styrene block-butadiene rubber block-styrene block which is prepared by copolymerization of butadiene rubber block with ethylene.

The styrene block copolymer in this invention is preferably hydrogenated styrene block copolymer. Hydrogenation of the butadiene rubber block can increase weatherability. In the styrene block copolymer, one or more blocks can be formed by polymerization of styrene block with maleic anhydride as comonomer. The addition of the maleic anhydride to the block results in the increase of heat-resistance. The preferable content of the comonomer, particularly maleic anhydride, in the block is approximately up to 10 weight %, specifically 0.1-10 weight %. The compatibilizer of the present invention is exemplified by maleic anhydride-hydrogenated styrene/butadiene/styrene copolymer (SEBS-MAH) containing approximately 1.5 weight % of maleic anhydride. Such hydrogenated styrene block copolymer is on the market and the method for producing the same is also well known.

The preferable content of the compatibilizer of the present invention in the low surface gloss styrene resin composed of (A) the basic resin and (B) the matting agent is 0.1-20 weight %, preferably 0.5-10 weight %. If the content is less than 0.1 weight %, miscibility will be poor. On the contrary, if the content is more than 10 weight %, particularly more than 20 weight %, the production costs will be increased.

(D) Additive for Improving Processibility

As an additive to improve processibility in this invention, a plasticizer can be used. At this time, any general plasticizer, for example phthalic acid ester based plasticizer such as di-butyl-phthalate (DBP), di-2-ethylhexyl phthalate (DEHP or DOP), di-isononyl phthalate (DINP), di-isodecyl phthalate (DIDP) and butyl benzyl phthalate (BBP); trimellitic acid ester based plasticizer such as tri-ethylhexyl trimellitate (TEHTM or TOTM), tri-isononyl trimellitate (TINTM) and tri-isodecyl trimellitate (TIDTM); phosphoric acid ester based plasticizer such as tri-cresyl phosphate (TCP), tri-2-ethylhexyl phosphate (TEHP or TOP), cresyl diphenyl phosphate (CDP) and tri-aryl phosphate (TAP); epoxy based plasticizer such as epoxidized soybean oil (ESO) and epoxidized linseed oil (ELO); polyester based plasticizer such as low polymerized polyester having average molecular weight of 1,000-8,000; aliphatic acid ester based plasticizer such as di-2-ethylhexyl adipate (DEHA or DOA), di-2-ethylhexyl azelate (DOZ) and di-isodecyl adipate (DIDA); and chlorinated paraffin based plasticizer can be used.

Melting point of the syndiotactic polystyrene resin (sPS) in this invention is about 270° C. When this resin is mixed with styrene resin, melt viscosity is decreased and thus processibility is reduced. Therefore, to improve processibility of the composition of the present invention, a plasticizer is used as an additive for improving processibility. In particular, di-isodecyl phthalate (DIDP) is the most preferred plasticizer. The preferable content of the plasticizer in the low surface gloss styrene resin composed of (A) the basic resin and (B) the matting agent is 0.1-30 weight %, more preferably 0.5-15 weight %. If the content is less than 0.1 weight %, miscibility will be decreased. On the contrary, if the content is more than 15 weight %, particularly larger than 30 weight %, production costs will be increased.

The low surface gloss styrene resin composition of the present invention can be prepared in the form of pellet by mixing and extruding each component by using single or twin screw extruder. At this time, barrel temperature of the extruder has not to be much lower than the melting point of syndiotactic polystyrene, the matting agent, for mixing and extruding of the composition. However, it is still preferred to extrude at low temperature to prevent the rubber-modified styrene polymer from being deteriorated. In general, the extrusion is performed at melting point of syndiotactic polystyrene or higher, but is preferably performed at the temperature lower than the melting point of the syndiotactic polystyrene but the margin at this time is not bigger than 10° C. and more preferably the margin is not bigger than 20° C.

The low surface gloss styrene resin composition of the present invention has 1-50 of the 75 gloss, preferably 15-35, when measured with a TOYOSEIKI gloss meter (UD).

The low surface gloss styrene resin composition can additionally include glossless filler. When the glossless filler is used together with the matting agent, gloss is significantly reduced, resulting in more improved low surface gloss effect and minimization of the decline of mechanical properties. As the glossless filler, B-Mat (crosslinked SAN, glass transition temperature: 122° C.) and inorganic fillers are known. The inorganic filler can be one or more compounds selected from the group consisting of spherical or platy inorganic fillers such as silicate based inorganic filler (ex: talc, mica, clay, montmorillonite and glass beads), silica, glass flake, calcium carbonate and metaloxide. The glossless filler herein can be cross-linked styrene-acrylonitrile copolymer.

The present invention also provides a sheet produced from the low surface gloss styrene resin composition and a composite article composed of the above sheet and another thermoplastic resin sheet, and a method for preparing the same.

The sheet herein can be prepared by extrusion of the pellet type low surface gloss styrene resin composition using single or twin screw extruder. At this time, the processing temperature is at least 180° C. and preferably at least 20° C. lower than the melting point of the matting agent. When the processing temperature meets the above, gloss property can be well expressed.

The above extrusion temperature is also proper for the production of a composite article by co-extruding the sheet prepared from the low surface gloss styrene resin composition of the present invention with one or more other thermoplastic resin sheets selected from the group consisting of acrylonitrile-butadiene-styrene resin and polyvinylchloride resin. At this time, the extrusion temperature is preferably the temperature around the melting point of the thermoplastic resin, precisely approximately at 200° C. that is the melting point of the polyvinylchloride used for co-extruding with the polyvinylchloride resin sheet. The thermoplastic resin can include an impact modifier, a processing aid, a heat stabilizer, an antioxidant, a UV stabilizer, a filler, a lubricant or a pigment.

The present invention also provides a composite article containing an inside layer and an outside layer that covers at least one of the surfaces of the inside layer to prevent the inside layer from being exposed on external environment. At this time, the inside layer is prepared by the thermoplastic resin that has not so good weatherability as the outside layer, while the outside layer is prepared by the low surface gloss styrene resin composition. The thermoplastic resin composing the inside layer can be one or more thermoplastic resins selected from the group consisting of acrylonitrile-butadiene-styrene resins and polyvinylchloride resins. The thermoplastic resin can include an impact modifier, a processing aid, a heat stabilizer, an antioxidant, a UV stabilizer, a filler, a lubricant or a pigment.

In this composite article, the inside layer can be a mono layer or be multi layers. The outside layer can be laminated on both sides of the inside layer. As explained hereinbefore, the inside layer and the outside layer can be bound serially by co-extrusion using an extruder. The outside layer has excellent weatherability, so that it can protect the inside layer from rays and weather. So, the composite article of the present invention can be applied in exterior products for structures such as sidings and window frames.

BRIEF DESCRIPTION OF THE DRAWINGS

The application of the preferred embodiments of the present invention is best understood with reference to the accompanying drawings, wherein:

FIG. 2 is a graph illustrating the apparent viscosity for the apparent shear rate compared between the composition containing a plasticizer and the composition not containing a plasticizer.

BEST MODE FOR CARRYING OUT THE INVENTION

Figure 1:
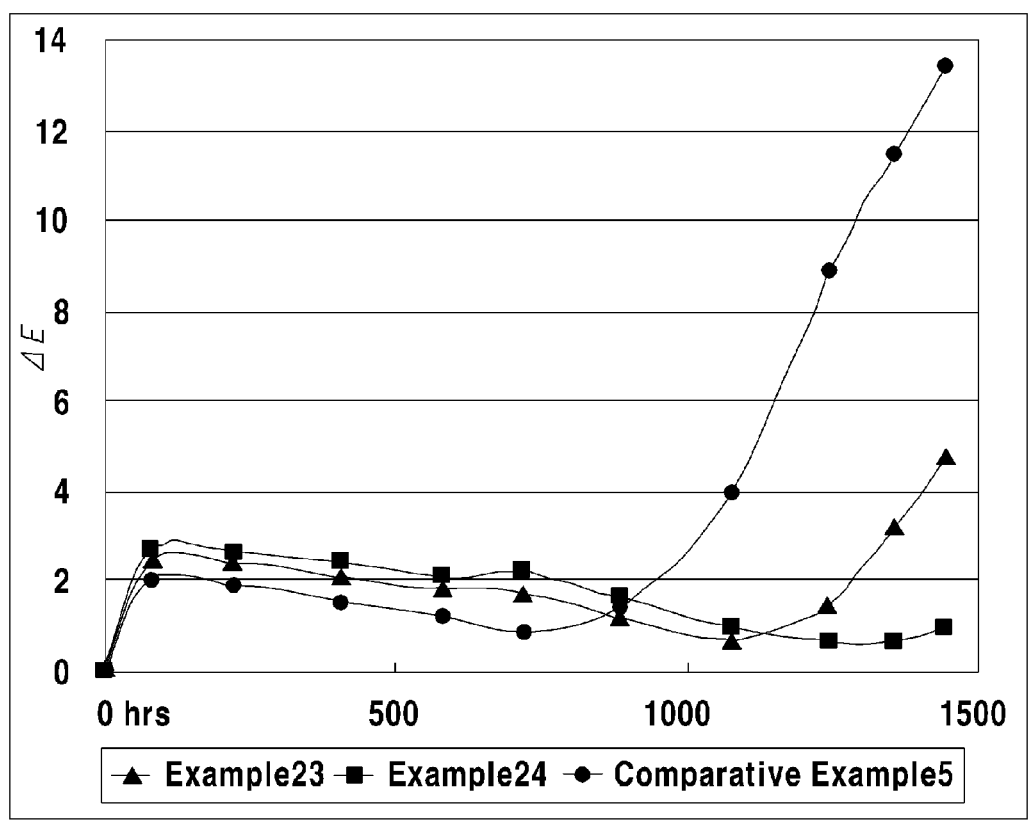
FIG. 1 is a graph illustrating that the resin prepared by the method of the present invention using styrene resin containing SAN-MMA as the basic resin has better weatherability than the resin containing styrene resin not containing SAN-MMA as the basic resin.

Practical and presently preferred embodiments of the present invention are illustrative as shown in the following Examples.

However, it will be appreciated that those skilled in the art, on consideration of this disclosure, may make modifications and improvements within the spirit and scope of the present invention.

EXAMPLES

Example 1~4, Comparative Example 1

Styrene resin was prepared by mixing SA927-DP resin (LG Chem., Ltd., Korea) containing acryl rubber and SAN resin (SAN 90HR, LG Chem., Ltd., Korea) having MI of 25 g/10 min (220° C.), according to the rubber content.

As a matting agent, sPS 130ZC (melting point: 270° C., Idemitsu Kosan Co., Ltd., Japan) was used.

The styrene resin and the matting agent were added according to the compositions shown in Table 3 to an extruder equipped with 27□ twin screw (Leistriz, Germany), to which 3 weight part of titanium dioxide (Cronos 2233) was added. Pellet was prepared after mixing under the processing conditions shown in Table 1.

A sheet (0.2□ in thickness) was prepared using the pellet by TSE16TC twin screw extruder (screw diameter: 16□, Thermo PRISM) and T-die under the conditions shown in Table 2. 75 gloss was measured by TOYOSEIKI gloss meter (UD), and the results are shown in Table 3. To express glossless properties of the sheet extruded in T-die, the processing was performed at the temperature 20° C. lower than the melting point of the matting agent.

TABLE 1

| Extruder | Barrel 1 | Barrel 2~11 | Die | Screw RPM | Injection rate |
|---|---|---|---|---|---|
| Leistritz | 250° C. | 260° C. | 260° C. | 350 | 15 kg/hr |

TABLE 2

| Extruder | Barrel 1 | Barrel 2~11 | Die | Screw RPM | Injection rate |
|---|---|---|---|---|---|
| Thermo | 190° C. | 200° C. | 200° C. | 250 | 3 kg/hr |

TABLE 3

| | Example 1 | Example 2 | Example 3 | Example 4 | Comparative Example 1 |
|---|---|---|---|---|---|
| Styrene resin (weight %) | 97 | 95 | 93 | 90 | 100 |
| Matting agent (weight %) | 3 | 5 | 7 | 10 | 0 |
| Gloss (75°) | 32.5 | 17.6 | 9.3 | 3.3 | 84.9 |

As shown in Table 3, the styrene resin compositions of Examples 1-4 containing sPS as a matting agent had lower gloss than the resin composition of Comparative Example 1 not containing the matting agent, suggesting that the composition of the present invention has excellent low surface gloss properties.

Examples 5~7

Experiments were performed by the same manner as described in Example 1 except that sPS-MAH TPSPS 8012PA (KOMETRA) containing MAH by 1.5 weight % and having melting point of 269° C. was used as a matting agent according to the compositions shown in Table 4.

TABLE 4

| | Example 5 | Example 6 | Example 7 |
|---|---|---|---|
| Styrene resin (weight %) | 97 | 95 | 90 |
| Matting agent (weight %) | 3 | 5 | 10 |
| Gloss (75°) | 45.8 | 25.9 | 3.6 |

As shown in Table 4, the styrene resin compositions of Examples 5-7 containing sPS-MAH as a matting agent had lower gloss than the composition of Comparative Example 1 not containing the matting agent, suggesting that the composition of the present invention has excellent low surface gloss properties.

Examples 8~9

Experiments were performed by the same manner as described in Example 1 except that Blendex-MAT was used as a glossless filler by 3 and 5 weight part respectively.

TABLE 5

| | Example 8 | Example 9 |
|---|---|---|
| Styrene resin (weight %) | 97 | 97 |
| Matting agent (weight %) | 3 | 3 |
| Blendex-MAT (weight part) | 3 | 5 |
| Gloss (75°) | 29.4 | 23.3 |

As shown in Table 5, the styrene resin compositions of Examples 8-9 containing the glossless filler in addition to the matting agent sPS exhibited lower gloss than the resin composition of Example 1, suggesting that these compositions have greater low surface gloss properties.

Examples 10~19, Comparative Example 2

To observe gloss changes over the processing temperature during the production of the styrene resin in Example 1, 10 weight % of sPS-MAH TPSPS 8012PA (KOMETRA) was added as a matting agent to 90 weight % of the styrene resin. Experiments were performed by the same manner as described in Example 1 except the processing temperature was controlled as shown in Table 6.

TABLE 6

| | Temperature for pellet production (° C.) | Temperature for sheet processing (° C.) | Gloss (75°) |
|---|---|---|---|
| Example 10 | 240 | 200 | 3.8 |
| Example 11 | 250 | | 4.2 |
| Example 12 | 260 | | 3.6 |
| Example 13 | 270 | | 3.8 |
| Example 14 | 280 | | 4.2 |
| Example 15 | 290 | | 4.3 |
| Example 16 | 260 | 200 | 3.6 |
| Example 17 | | 215 | 3.3 |
| Example 18 | | 230 | 3.9 |
| Example 19 | | 245 | 29.3 |
| Comparative Example 2 | | 260 | 89.8 |

As shown in Table 6, the styrene resin compositions of Examples 10-19 processed at the temperature at least 20° C. lower than the melting point of the matting agent during the sheet production exhibited excellent glossless properties, compared with the composition of Comparative Example 2 processed at the temperature out of the above range.

Examples 20~22, Comparative Examples 3 and 4

(A) Styrene resin was prepared by mixing (a) SA927-DP resin (LG Chem., Ltd., Korea) containing acryl rubber and (b1) SAN resin (SAN 90HR, LG Chem., Ltd., Korea) having MI of 25 g/10 min (220° C.), according to the weight ratio shown in Table 2. (B) As a matting agent, sPS 130ZC (melting point: 270° C., Idemitsu Kosan Co., Ltd., Japan) was used. (C) As a compatibilizer, SEBS-MAH Scona TPKD 8112 (Kometra) was used.

The styrene resin, the matting agent and the compatibilizer were added according to the compositions (unit: weight part) shown in Table 9 to an extruder, to which 0.5 weight part of titanium dioxide (Cronos 2233) was added. Pellet was prepared after mixing under the processing conditions shown in Table 7 using a twin screw (diameter: 27☐, Leistritz, Germany) extruder.

A sheet (3☐ in thickness) was prepared using the pellet by TSE16TC 3-layer extrusion (EM, Korea) and T-die under the conditions shown in Table 8. 75° gloss was measured by TOYOSEIKI gloss meter (UD), and the results are shown in Table 3. To express glossless properties of the sheet extruded in T-die, the processing was performed at the temperature 20° C. lower than the melting point of the matting agent.

Evaluation of the physical properties was performed as follows.

(1) Gloss: TOYOSEIKI (GLOSS METER UD) 75° measurement (%)
(2) Impact strength: ASTM D-256 (kg·cm/cm)
(3) Weatherability: Atlas UV-2000
Condition—LIGHT SOURCE: UV-A LAMP
SEGMENT 1(UV)
BLACK PANEL TEMPERATURE: 60° C.
IRRADIANCE: 0.77 W/☐

As the numerical mean of Hunter Lab values before and after the weatherability test approaches 0, weatherability is more excellent.

$$\Delta E = \sqrt{\{(L-L')^2+(a-a')^2+(b-b')^2\}}$$

(4) Capillary test: RHEO-TESTER 1501 (Temp.:200° C., Shear Rate:1~3000 s$^{-1}$)

TABLE 7

| Extruder | Barrel 1 | Barrel 2~11 | Die | Screw RPM | Injection rate |
|---|---|---|---|---|---|
| LEISTRITZ | 260° C. | 270° C. | 270° C. | 250 | 15 kg/hr |

TABLE 8

| Extruder | Barrel 1 | Barrel 2~11 | Die | Screw RPM | Injection rate |
|---|---|---|---|---|---|
| EM, Korea | 190° C. | 200° C. | 200° C. | 250 | 3 kg/hr |

TABLE 9

| | | Example 20 | Example 21 | Example 22 | Comparative Example 3 | Comparative Example 4 |
|---|---|---|---|---|---|---|
| A | a | 50 | 50 | 50 | 50 | 50 |
| | b b1 | 47 | 45 | 43 | 50 | 45 |
| | b2 | — | — | — | — | — |
| B | | 3 | 5 | 7 | — | 5 |
| C | | 1 | 1 | 1 | — | — |
| D | | — | — | — | — | — |
| Gloss (75°) | | 27 | 23 | 20 | 84.5 | 23 |
| Impact strength (¼") | | 9.0 | 8.5 | 5.0 | 25 | 8.2 |

As shown in Table 9, the styrene resin compositions of Examples 20-22 containing sPS as a matting agent exhibited lower gloss than the resin composition of Comparative Example 3 not containing the matting agent, suggesting that these compositions have greater low surface gloss properties. As shown in Example 21 and Comparative Example 4, the addition of a compatibilizer improved miscibility between the styrene resin and the matting agent, resulting in the improvement of impact strength.

Examples 23~26

Experiments were performed by the same manner as described in Example 20 except that XT500 (LG Chem., Ltd., Korea) was used as (b2) the SAN-MMA resin having MI of 50 g/10 min (220° C.) and DIDP (LG Chem., Ltd., Korea) was used as the plasticizer for improving processability according to the compositions shown in Table 10.

TABLE 10

| | | Example 23 | Example 24 | Example 25 | Example 26 | Comparative Example 5 |
|---|---|---|---|---|---|---|
| A | a | 50 | 50 | 50 | 50 | 50 |
| | b b1 | 35 | 25 | 35 | 35 | 45 |
| | b2 | 10 | 20 | 10 | 10 | — |
| B | | 5 | 5 | 5 | 5 | 5 |
| C | | 1 | 1 | 1 | 1 | 1 |
| D | | — | — | 5 | 10 | — |
| Gloss (75°) | | 22 | 23 | 22 | 22 | 24 |
| Impact strength (¼") | | 8.5 | 8.3 | 9.0 | 10.2 | 8.5 |

As shown in Table 10, the styrene resin compositions of Examples 23-26 exhibited as good low gloss properties as the resin composition of Comparative Example 5 not containing SAN-MMA and the additive for improving processability had. Particularly, the compositions of Examples 25 and 26 exhibited improved impact-resistance by the addition of DIDP, the additive for improving processability.

As shown in FIG. 1, as the SAN-MMA content increased, DE changed less and thus weatherability increased.

As shown in FIG. 2, the addition of an additive for improving processability resulted in the decrease of melt viscosity, which favored the production in fact.

INDUSTRIAL APPLICABILITY

According to the present invention, the low surface gloss styrene resin composition prepared by mixing the basic resin having excellent weatherability and impact-resistance and the matting agent, syndiotactic polystyrene, retains excellent weatherability and impact-resistance of the included basic resin without deterioration. Further, the addition of a compatibilizer to the composition of the present invention improves impact-resistance.

According to the present invention, the addition of plasticizer to the composition composed of the basic resin and the matting agent results in the increase of processability and impact-resistance as well.

According to the present invention, the addition of the mixture comprising rubber-modified styrene polymer and non-rubber modified styrene copolymer, particularly styrene-acrylonitrile copolymer and styrene-acrylonitrile-(meth)acrylate copolymer to the basic resin results in the increase of weatherability.

According to the present invention, a sheet is produced from the low surface gloss styrene resin composition of the invention at the temperature lower than melting temperature of the syndiotactic polystyrene used as a matting agent, by which physical properties of the sheet, in particular, weatherability and impact-resistance can be improved without deterioration.

Therefore, the sheet and the composite article produced by using the low surface gloss styrene resin composition have excellent weatherability and impact-resistance in addition to the excellent low gloss properties, so that they can be applied in various fields, especially in exterior products for structures including sidings and window frames.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A styrene resin composition comprising:
   (A) 80-99.9 weight % of a basic resin containing rubber-modified styrene polymer; and
   (B) 0.1-20 weight % of a syndiotactic polystyrene as a matting agent for reducing the gloss of said composition, wherein the syndiotactic polystyrene contains a carboxylic acid group on at least one of its terminals or is prepared by copolymerization of a comonomer selected from the group consisting of maleic anhydride, maleic acid, fumaric acid, and glycidyl-methacrylate with styrene monomer; and the content of the comonomer is 0.1-10 weight %.

2. The styrene resin composition according to claim 1, wherein the rubber-modified styrene polymer is prepared by copolymerization of a styrene monomer and optionally, an unsaturated ethylene compound in the presence of a rubber.

3. The styrene resin composition according to claim 2, wherein the rubber is one or more selected from the group consisting of polybutadiene, polyisoprene, styrene-butadiene copolymer, acrylonitrile-butadiene copolymer, alkyl acrylate rubber, ethylene-propylene rubber, ethylene-propylene-diene rubber and silicon rubber.

4. The styrene resin composition according to claim 2, wherein the rubber-modified styrene polymer contains the rubber at 5-30 weight %.

5. The styrene resin composition according to claim 2, wherein the styrene monomer is selected from the group consisting of styrene, α-methylstyrene, o-methylstyrene, p-methylstyrene, m-methylstyrene, 1,3-dimethylstyrene and tert-butylstyrene.

6. The styrene resin composition according to claim 2, wherein the unsaturated ethylene compound is one or more compounds selected from the group consisting of acrylonitrile, methacrylonitrile, $C_1$-$C_4$ alkyl acrylate and alkyl methacrylate, acrylic acid, methacrylic acid, maleic anhydride, acrylamide and vinyl methyl ether.

7. The styrene resin composition according to claim 2, wherein the rubber-modified styrene polymer contains the rubber at 5-30 weight %, the styrene monomer at 40-90 weight % and the unsaturated ethylene compound at 5-30 weight %.

8. The styrene resin composition according to claim 1, wherein
   (A) the basic resin additionally includes a non-rubber modified styrene copolymer prepared by copolymerization of a styrene monomer and an unsaturated ethylene compound.

9. The styrene resin composition according to claim 8, wherein the non-rubber modified styrene copolymer contains the unsaturated ethylene compound at 20-80 weight %.

10. The styrene resin composition according to claim 8, wherein the non-rubber modified styrene copolymer is one or more selected from the group consisting of styrene-acrylonitrile copolymer, styrene-acrylonitrile-methylmethacrylate terpolymer, α-methylstyrene-acrylonitrile copolymer, styrene-methylmethacrylate copolymer, styrene-maleic anhydride copolymer, α-methylstyrene-styrene-acrylonitrile terpolymer, styrene-acrylonitrile-maleic anhydride terpolymer, styrene-acrylonitrile-acrylic acid terpolymer and α-methylstyrene-styrene-acrylonitrile terpolymer.

11. The styrene resin composition according to claim 8, wherein the non-rubber modified styrene copolymer is a mixture of styrene-acrylonitrile copolymer and styrene-acrylonitrile-(meth)acrylate copolymer.

12. The styrene resin composition according to claim 11, wherein the styrene-acrylonitrile copolymer is prepared by copolymerization of 50-90 weight % of styrene copolymer and 10-50 weight % of acrylonitrile copolymer and has an weight average molecular weight of 50,000-250,000; and the styrene-acrylonitrile-(meth)acrylate copolymer is prepared by copolymerization of 40-90 weight % of (meth)acrylate monomer, 15-40 weight % of styrene monomer and 3-20 weight % of acrylonitrile monomer.

13. The styrene resin composition according to claim 1, wherein the syndiotactic polystyrene has at least 85% tacticity in the case of a dyad and at least 35% in the case of a pentad.

14. The styrene resin composition according to claim 1, wherein the composition additionally includes (C) a hydrogenated styrene block copolymer comprising styrene block and butadiene rubber block as a compatibilizer at 0.1-20 weight % of the total weight of the styrene.

15. The styrene resin composition according to claim 14, wherein at least one of the blocks of the hydrogenated styrene block copolymer is formed by copolymerization of the monomer in the block and maleic anhydride, and the content of the maleic anhydride as a comonomer is 0.1-10 weight % of the total weight of the block.

16. The resin composition according to claim 1, wherein the composition additionally includes (D) a plasticizer at 0.1-30 weight % of the total weight of the styrene resin.

17. The styrene resin composition according to claim 16, wherein the plasticizer is one or more compounds selected from the group consisting of di-butyl-phthalate (DBP), di-2-ethylhexyl phthalate (DEHP or DOP), di-isononyl phthalate (DINP), di-isodecyl phthalate (DIDP) and butyl benzyl phthalate (BBP); tri-ethylhexyl trimellitate (TEHTM or TOTM), tri-isononyl trimellitate (TINTM) and tri-isodecyl trimellitate (TIDTM); tri-cresyl phosphate (TCP), tri-2-ethylhexyl phosphate (TEHP or TOP), cresyl diphenyl phosphate (CDP) and tri-aryl phosphate (TAP); epoxidized soybean oil (ESO) and epoxidized linseed oil (ELO); polymerized polyester; di-2-ethylhexyl adipate (DEHA or DOA), di-2-ethylhexyl azelate (DOZ) and di-isodecyl adipate (DIDA); and chlorinated paraffin based plasticizer.

18. The styrene resin composition according to claim 1, wherein the composition additionally includes a glossless filler at 0.1-20 weight % of the total weight of the styrene resin.

19. The styrene resin composition according to claim 18, wherein the glossless filler is selected from the group consisting of a crosslinked SAN, a silicate based inorganic filler, glass beads, silica, glass flake, calcium carbonate and metaloxide.

20. The styrene resin composition according to claim 18, wherein the glossless filler is a crosslinked styrene-acrylonitrile copolymer.

21. The styrene resin composition according to claim 1, wherein the gloss of the composition is 1-50 at 75°.

22. A sheet prepared by any one of the styrene resin compositions of claim 1.

23. A method for producing a sheet comprising the step of extruding one of the styrene resin compositions of claim 1 at a temperature of at least 80° C. and at least 20° C. lower than the melting point of the matting agent, syndiotactic polystyrene, by using an extruder.

24. The method for producing a sheet according to claim 23, wherein the sheet in a complex form is produced by co-extruding a thermoplastic resin composition and a styrene resin composition to prepare two sheets; and pressing the two sheets to prepare a multilayer sheet.

25. The method for producing a sheet according to claim 24, wherein the thermoplastic resin is one or more resins selected from the group consisting of acrylonitrile-butadiene-styrene resins and polyvinylchloride resins.

26. A composite article containing an inside layer and an outside layer that covers at least one of the surfaces of the inside layer to prevent the inside layer from being exposed to an external environment, wherein the inside layer is prepared by a thermoplastic resin having less weatherability than the outside layer and the outside layer is formed by one of the styrene resin compositions of claim 1.

27. The composite article according to claim 26, wherein the thermoplastic resin of the inside layer is one or more resins selected from the group consisting of acrylonitrile-butadiene-styrene resins and polyvinylchloride resins.

28. A styrene resin composition comprising:

(A) 80-99.9 weight % of a basic resin containing rubber-modified styrene polymer; and (B) 0.1-20 weight % of a syndiotactic polystyrene as a matting agent for reducing the gloss of said composition;

wherein the basic resin (A) additionally includes a non-rubber modified styrene copolymer prepared by copolymerization of a styrene monomer and an unsaturated ethylene compound;

wherein the non-rubber modified styrene copolymer is a mixture of styrene-acrylonitrile copolymer and styrene-acrylonitrile-(meth)acrylate copolymer;

wherein the styrene-acrylonitrile copolymer is prepared by copolymerization of 50-90 weight % of styrene copolymer and 10-50 weight % of acrylonitrile copolymer and has an weight average molecular weight of 50,000-250,000; and the styrene-acrylonitrile-(meth)acrylate copolymer is prepared by copolymerization of 40-90 weight % of (meth)acrylate monomer, 15-40 weight % of styrene monomer and 3-20 weight % of acrylonitrile monomer; and wherein the syndiotactic polystyrene (B) contains a carboxylic acid group on at least one of its terminals or is prepared by copolymerization of a comonomer selected from the group consisting of maleic anhydride, maleic acid, fumaric acid and glycidyl-methacrylate with styrene monomer; and the content of the comonomer is 0.1-10 weight %.

* * * * *

UNITED STATES PATENT AND TRADEMARK OFFICE
CERTIFICATE OF CORRECTION

PATENT NO. : 8,378,024 B2
APPLICATION NO. : 12/525575
DATED : February 19, 2013
INVENTOR(S) : Yun-kyoung Cho et al.

It is certified that error appears in the above-identified patent and that said Letters Patent is hereby corrected as shown below:

In the Specification
Column 1, line 43 "has" should read -- have --.
Column 2, lines 8, 12, 28 and 41 "☐" should read -- µm --.
Column 2, line 56 delete ",".
Column 7, line 48 "known syndiotactic" should read -- known as syndiotactic --.
Column 10, lines 58, 62 and 63 "☐" should read -- mm --.
Column 12, line 66 "☐" should read -- mm --.
Column 13, line 1 "☐" should read -- mm --.
Column 13, line 17 "☐" should read -- $m^3$ --.

In the Claims
Column 16, line 8 "an" should read -- a --.
Column 18, line 14 "an" should read -- a --.

Signed and Sealed this
Twenty-first Day of April, 2015

Michelle K. Lee
*Director of the United States Patent and Trademark Office*